(No Model.) 2 Sheets—Sheet 1.
J. F. PLATT.
HAY LOADER.
No. 526,537. Patented Sept. 25, 1894.
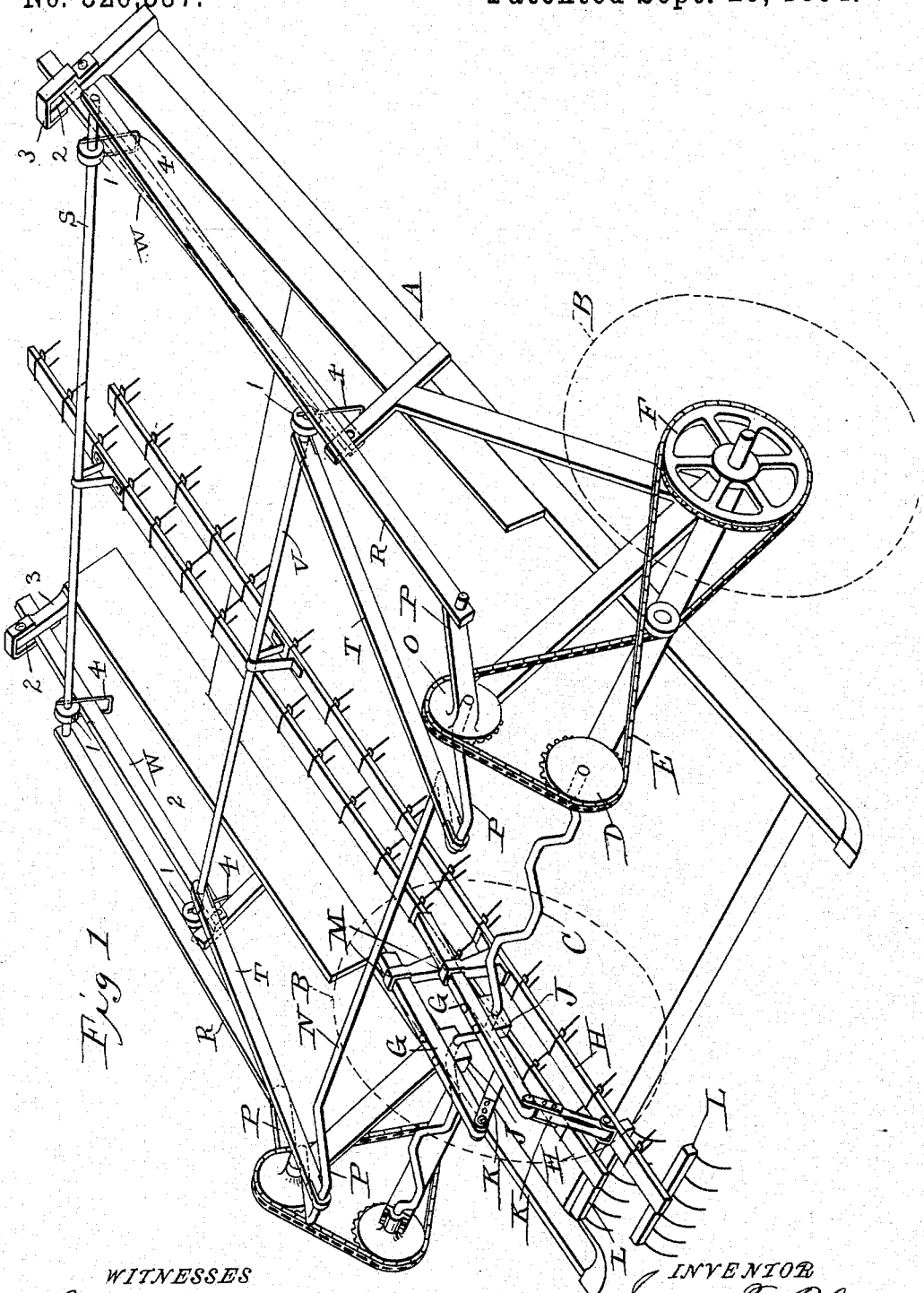
WITNESSES
Cole Burdine
C. B. Bull
INVENTOR
James F. Platt
per John G. Manahan
his Attorney (No Model.) 2 Sheets—Sheet 2.
J. F. PLATT.
HAY LOADER.
No. 526,537. Patented Sept. 25, 1894.
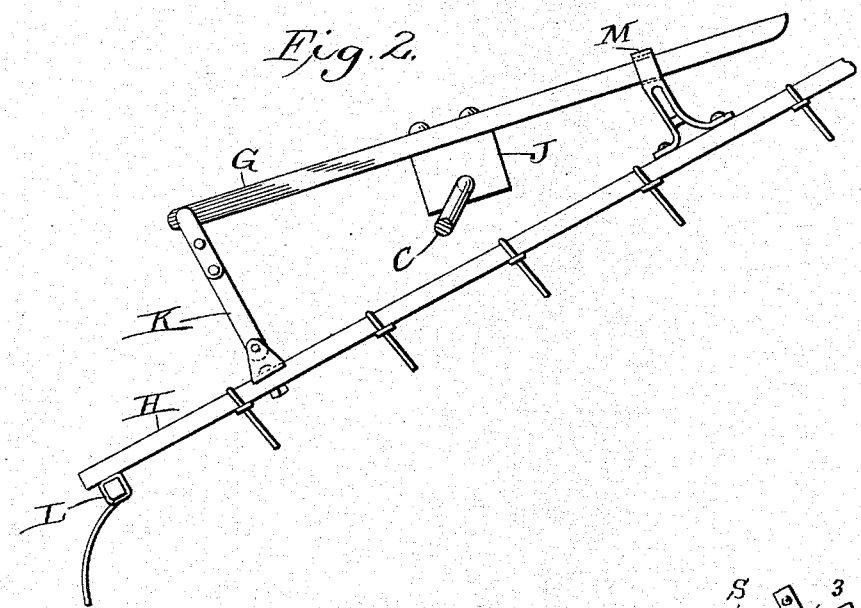
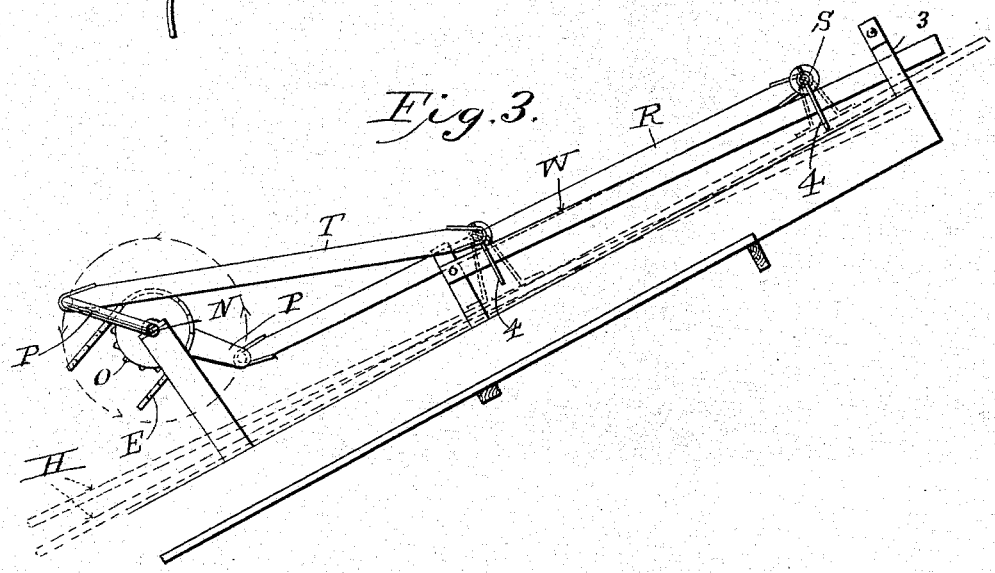
WITNESSES
Cle Burdine
E. B. Bull
INVENTOR
James F. Platt
per John G. Manahan
his Attorney

UNITED STATES PATENT OFFICE.

JAMES F. PLATT, OF STERLING, ILLINOIS.

HAY-LOADER.

SPECIFICATION forming part of Letters Patent No. 526,537, dated September 25, 1894.

Application filed July 18, 1894. Serial No. 517,899. (No model.)

*To all whom it may concern:*

Be it known that I, JAMES F. PLATT, a citizen of the United States, residing at Sterling, in the county of Whiteside and State of Illinois, have invented certain new and useful Improvements in Hay-Loaders; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention has reference to certain improvements in that class of hay loaders in which a series of rakes, operating in parallel lines, and provided with engaging projections on the lower surface of the rake bars or handles, are utilized to continuously and successively advance the hay up an incline, carried on two wheels and attached to the rear of the hay wagon.

In the class of hay loaders referred to, the hay engaging and elevating rakes have necessarily two movements—one in a vertical plane, and one in the line of the platform over which they are suspended. The former movement is attained by journaling the rake bars respectively at the angles or elbows of the rotating, zigzag or crank shaft. This attachment imparts to the rake the necessary rise and fall, and a degree of reciprocal movement; but not a sufficient length of the latter. The added reciprocal or longitudinal movement of the rake bars essential to force the hay up the incline aforesaid, must be obtained, if at all, by mechanism outside of, and supplemental to the operation of the aforesaid crank shaft. This has been sought to be accomplished heretofore in various modes, but inasmuch as the rake bars, while journaled on the aforesaid crank shaft, must have a longitudinal play in excess of the diameter of the orbital movement of said attachment, and the rake proper during the interval of its inward movement must be held uniformly to the surface of the ground, this supplemental movement of the rake and its bar has been difficult of satisfactory attainment.

My improvement pertains in a two fold manner to this department of the species of loaders referred to, and consists, first, in attaching the rake bars to the rear end of a short bar, carried on the aforesaid crank shaft by a flexible or toggle connection and to the front of said short bar by a sleeve attachment whereby the relation of the rake bar to said short bar, and therefore to the crank shaft, can be predetermined and regulated at each and every point of its round movement; second, in a supplemental independent shaft having the sole function of imparting to the rake bar the necessary supplemental reciprocal movement before mentioned.

As my invention pertains to only one part of the aforesaid loader, and the residue of the latter is well known, I do not deem it necessary to show or describe the entire structure, but will confine the description herein to the parts embodying my invention, and such adjunctive parts as may be necessary to illustrate the construction, location, and operation of my invention.

In the drawings, Figure 1 is a perspective of a portion of a hay loader embodying my invention. Fig. 2 is a detail of the arm carried on the aforesaid crank shaft and my method of attaching the rake bar thereto. Fig. 3 is a detail of a portion of the mechanism employed in giving the aforesaid additional sweep to the rake and rake bars.

Similar letters and figures refer to similar parts throughout the several views.

A is the frame of the machine, supported in the usual mode, near its rear end, upon two carrying wheels B B, and adapted to be attached to the rear of a hay wagon.

C is the crank shaft referred to, which extends transversely across the machine above the rake bars, and is rotated by a sprocket wheel D, seated rigidly thereon, the latter being driven by a sprocket chain E from the sprocket wheel F on the carrying wheel B. As the driving mechanism, heretofore and hereinafter to be described, is the same at each side of the machine, the description of one side will suffice for both.

Referring to Fig. 2, G is a short arm placed above the usual rake bar H and in the vertical plane thereof. The arm G is pivotally attached to the crank shaft C, at the elbow or angle of the latter, by means of the box J loosely seated on said shaft and bolted to the under side of said arm.

K is a short arm hinged, at its lower end, to the upper surface of the rake bar H, within a short distance of the location of the rake L, and hinged at its upper end to the lower or rear end of the arm G. The opposite and free end of the arm G is projected through, and adapted to reciprocate loosely within a metallic sleeve M, seated on the rake bar H, on the opposite side of the crank shaft C from the locality of the arm K. In the flexions of the arm K, the upper end of the arm G transverses the sleeve M to accord therewith.

N is a rotating shaft seated on the frame A a suitable distance above the rake bars H and provided with the sprocket wheels O rigidly seated on each end thereof, and adapted to be also driven by the sprocket chain E. The shaft N is also provided at each end with the oppositely projecting crank wrists P P, one within and one without the sprocket wheel O. The outer wrist P is connected by a pitman R to a cross rod S supported near the upper end of the frame, above the rake bars H, and to which each alternate one of said bars is attached in any suitable mode.

The inner wrist pin P is suitably connected, by means of a pitman T, to a cross rod V supported on the frame A above the rake bars H, between shaft N and cross rod S, and to said cross rod V the alternate rake bars H, not attached to cross rod S are attached. Each end of the rods S and V is provided with friction rollers 1, adapted to transverse the plates W in the oscillations of said cross rod. The plates W which furnish the track and support for the rollers 1, are pivoted at their lower ends to the frame A and have their upper ends respectively projected through a vertical slot 2 formed in the upper corner posts 3 of frame A whereby, the upper end of plates W can rise automatically to relieve the pressure of the accumulated hay under the upper portion of the rake bars H, and expedite the exit of such hay. Rollers 1 are held on plates W by stirrups 4 attached to rods V and S each side of said rollers and extending below, and inclosing plate W. Said stirrups being slightly longer than the width of plates W permits a limited upward play to rods S and V.

The advantages of my invention are that by the use of the sleeve M, the portion of the arm G reciprocating at any time therein, is held at a certain altitude above the rake bar H, and a corresponding downward pressure exerted, across the crank shaft C, upon the lower portion of the rake bar H, through the medium of the flexible arm K, and that the relation of the lower end of the rake bar H to the lower end of the arm G is predetermined and fixed at every point of longitudinal movement of the rake bar H.

What I claim as my invention, and desire to secure by Letters Patent of the United States, is—

1. The combination of the rake bar H provided with sleeve M, means for reciprocating said bar rotating crank shaft C suitably supported above the bars H, arm G about centrally pivoted on the angles of said shaft, with its upper end projecting through, and adapted to reciprocate within the sleeve M, and the arm K flexibly connected with the opposite end of arm G and to the adjacent portion of the bar H substantially as shown and for the purpose described.

2. The combination of the rake bars H provided with rake L, and sleeve M, a suitably rotated crank shaft C, seated transversely above the rake bars H, arm G pivotally seated on the shaft C at the angles of the latter, and with its upper end projected through, and adapted to reciprocate in the sleeve M, the arm K flexibly connecting the opposite end of arm G with the bar H, the shaft N provided with oppositely projected crank wrists P, cross rods S, and V, attached respectively to the alternate rake bars H, pitmen R and T connecting respectively the crank wrists P and rods S and V and means substantially as shown for rotating the shafts C and N for the purposes described.

3. The combination of the frame A, the reciprocating rake bars H provided with rake L, transverse rods S and V provided with rollers 1 and suitably attached respectively to bars H, means for reciprocating the latter, posts 3 seated on said frame and provided with vertical slot 2, and plates W pivoted to said frame at their lower ends, and having their upper ends respectively loosely placed in said slots 2, and adapted to adjustably support said rods S and V substantially as shown and for the purpose described.

In testimony whereof I affix my signature in presence of two witnesses.

JAMES F. PLATT.

Witnesses:
JOHN G. MANAHAN,
M. ISABELLE MANAHAN.